(12) United States Patent
Sjöberg et al.

(10) Patent No.: US 11,552,463 B2
(45) Date of Patent: Jan. 10, 2023

(54) REMOVABLE BUSHING FLANGE

(71) Applicant: HITACHI ENERGY SWITZERLAND AG, Baden (CH)

(72) Inventors: Peter Sjöberg, Ludvika (SE); Jakob Emmel, Rodgau (DE); Jan Czyzewski, Cracow (PL); Ansgar Dais, Obfelden (CH); Fabian Stacy, Jackson, TN (US); Leif Roosgardh, Ludvika (SE)

(73) Assignee: Hitachi Energy Switzerland AG, Baden (CH)

( * ) Notice: Subject to any disclaimer, the term of this patent is extended or adjusted under 35 U.S.C. 154(b) by 21 days.

(21) Appl. No.: 15/734,616

(22) PCT Filed: May 30, 2019

(86) PCT No.: PCT/EP2019/064151
§ 371 (c)(1),
(2) Date: Dec. 3, 2020

(87) PCT Pub. No.: WO2019/233885
PCT Pub. Date: Dec. 12, 2019

(65) Prior Publication Data
US 2021/0159682 A1 May 27, 2021

(30) Foreign Application Priority Data
Jun. 4, 2018 (EP) .................... 18175691

(51) Int. Cl.
*H02G 3/22* (2006.01)
(52) U.S. Cl.
CPC .................... *H02G 3/22* (2013.01)
(58) Field of Classification Search
CPC ...... H01B 19/00; H01B 17/301; H01B 17/28; H02G 3/22
See application file for complete search history.

(56) References Cited

U.S. PATENT DOCUMENTS 3,165,577 A * 1/1965 Meier ................. H01B 17/46
174/144
3,692,927 A * 9/1972 Ellaschuk ................ H02G 7/00
174/211

(Continued)

FOREIGN PATENT DOCUMENTS

CN 102800468 A * 11/2012
CN 203481020 U 3/2014

(Continued)

OTHER PUBLICATIONS

International Search Report and Written Opinion dated Jul. 31, 2019 for International Patent Application No. PCT/EP2019/064151, 11 pages.

(Continued)

*Primary Examiner* — William H. Mayo, III
*Assistant Examiner* — Rhadames Alonzo Miller
(74) *Attorney, Agent, or Firm* — Sage Patent Group

(57) ABSTRACT

A flange fitted around a round cylindrical condenser core of a bushing is described. The flange comprises an annular lower flange part arranged to fit around a radial shoulder of the condenser core such that a lower shoulder chamfer of the shoulder rests against lower flange chamfer of the lower flange part around the circumference of the condenser core; and an annular upper flange part fastened to the lower flange part and fits around the condenser core above an upper shoulder chamfer of the shoulder. An upper flange chamfer of the upper flange part is between an upper sealing element and a lower sealing element, forming an annular chamfer space is formed between the upper flange chamfer and the upper shoulder chamfer between the upper and lower sealing elements. The flange comprises an injection through hole for a filler material to be injected there through to fill the chamfer space.

20 Claims, 2 Drawing Sheets

(56) References Cited

U.S. PATENT DOCUMENTS

| | | | | |
|---|---|---|---|---|
| 4,121,046 A | * | 10/1978 | Fujita | H01B 17/42 174/140 CR |
| 6,984,790 B1 | * | 1/2006 | Bernstorf | H01B 17/44 174/140 R |
| 9,552,907 B2 | | 1/2017 | Emilsson et al. | |
| 2012/0186853 A1 | * | 7/2012 | Rose | H01B 17/10 174/139 |
| 2014/0125439 A1 | * | 5/2014 | Esseghir | C08G 59/686 336/61 |
| 2019/0103205 A1 | * | 4/2019 | Kolehmainen | H01B 17/44 |

FOREIGN PATENT DOCUMENTS

| | | | |
|---|---|---|---|
| CN | 102800468 B | | 6/2015 |
| CN | 204632476 U | | 9/2015 |
| CN | 205140714 U | * | 4/2016 |
| CN | 205140714 U | | 4/2016 |
| DE | 19844411 A1 | | 4/2000 |
| JP | S52-132395 A | | 11/1977 |
| JP | H08140254 A | | 5/1996 |
| JP | 2016081894 A | | 5/2016 |
| KR | 20160098525 A | | 8/2016 |

OTHER PUBLICATIONS

Extended European Search Report dated Dec. 6, 2018 for European Patent Application No. 18175691.7, 8 pages.

Chinese First Office Action dated Oct. 19, 2021 for Chinese Patent Application No. 201980036920.X, 10 pages (including English summary).

Korean Decision for Grant of Patent dated Jul. 18, 2022 for Korean Patent Application No. 10-2020-07034647, 3 pages (including English translation).

* cited by examiner

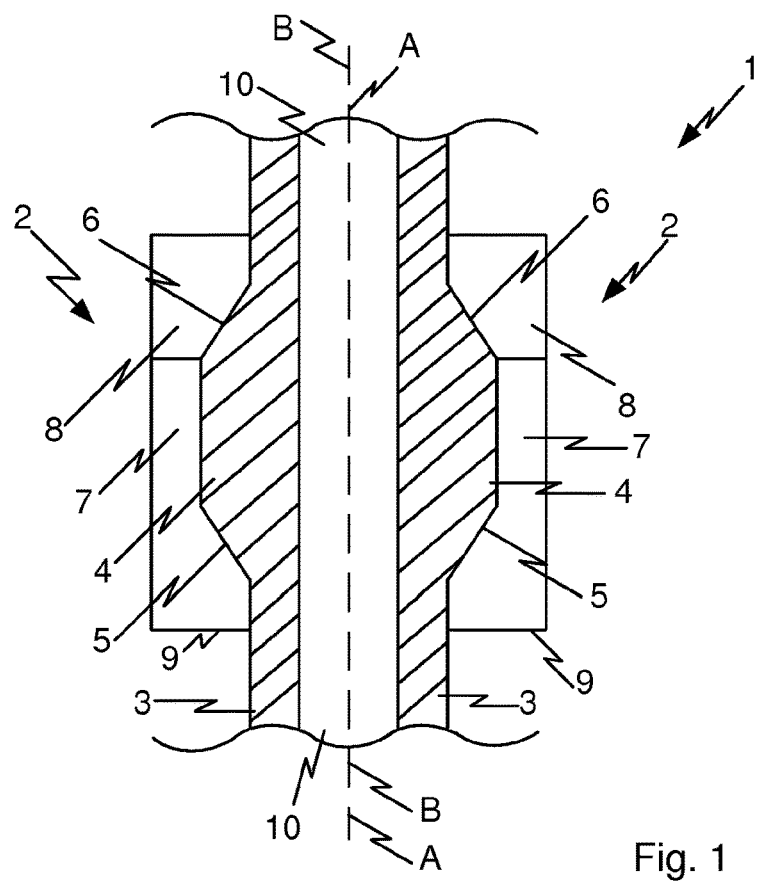
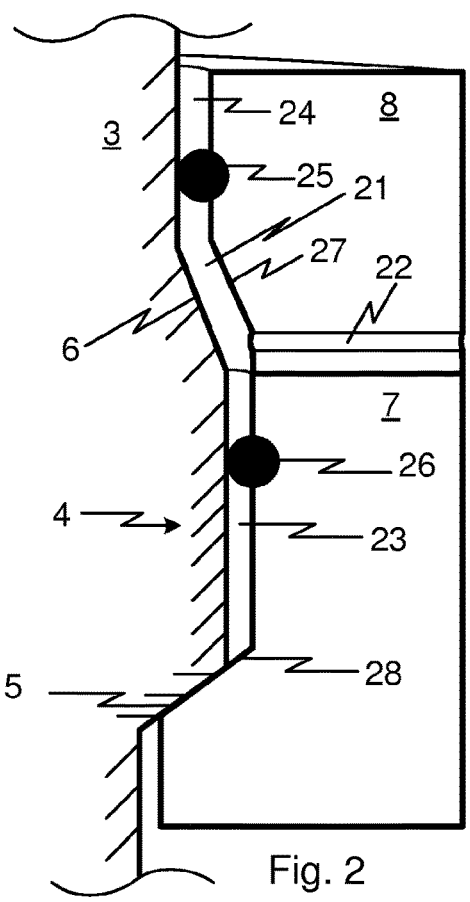
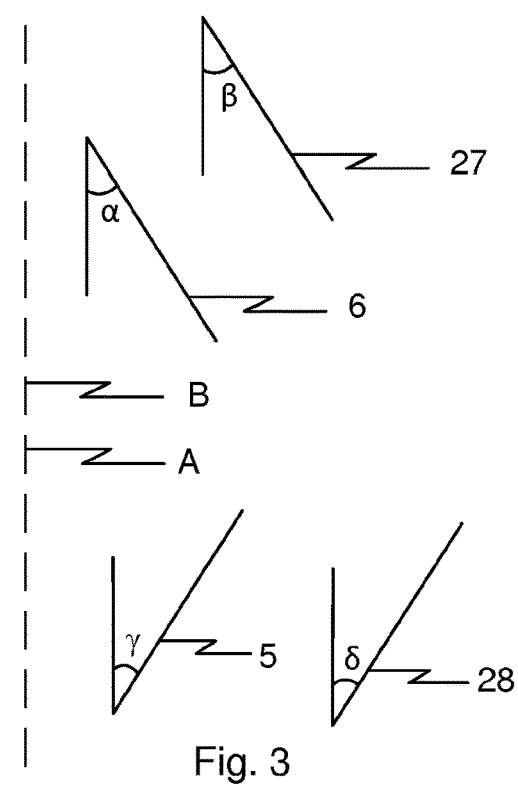
Fig. 1
Fig. 2
Fig. 3

REMOVABLE BUSHING FLANGE

CROSS-REFERENCE TO RELATED APPLICATIONS

This application is a 35 U.S.C. § 371 national stage application of PCT International Application No. PCT/EP2019/064151 filed on May 30, 2019, which itself claims priority to European Patent Application No. 18175691.7 filed Jun. 4, 2018, the disclosures and contents of which are incorporated by reference herein in their entireties.

TECHNICAL FIELD

The present disclosure relates to a flange for a condenser core of a bushing.

BACKGROUND

Bushings can be produced out of different materials. As examples, the condenser core of bushings can be made of Resin Impregnated Paper (RIP) or Resin Impregnated Synthetics (RIS). Both of these resin, e.g. epoxy, systems have in common that the cured resin, after moulding at high temperature, shrinks due to thermal and chemical shrinkage. RIP condenser cores are machined to the final dimensions for removal of the brittle unfilled epoxy which remains between the wound paper of the core and the mould. Thereby, small production tolerances are achieved. RIS bushings with filled epoxy material do not need to be machined because the filled epoxy material is not brittle. However, as a consequence of not machining, less accurate dimensions (larger production tolerances due to shrinkage) are obtained compared with RIP, resulting in less accurate fit with a standard flange to be fitted around the condenser core of the bushing.

JP S52 132395 discloses a flange which is fitted to a bushing where the condenser of the bushing is passed through the flange until the flange comes to rest on a 90° stepped part of the outer periphery of the condenser. Then, through a hole in the flange, a flexible resin (silicone) is introduced to fill the gap between the flange and the condenser and cured in place.

A problem with introducing a thermosetting resin which acts as a glue between the flange and the condenser core is that it is difficult to salvage the flange for reuse if the condenser core is damaged or otherwise defect and has to be discarded, in which case the flange will also be discarded.

SUMMARY

It is an objective of the present invention to provide a bushing flange which is removable from the condenser core.

According to an aspect of the present invention, there is provided a flange to be fitted around a round cylindrical condenser core of a bushing. The flange comprises an annular lower flange part arranged to fit around a radial shoulder of the condenser core such that a lower shoulder chamfer of the shoulder rests against lower flange chamfer of the lower flange part around the circumference of the condenser core. The flange also comprises an annular upper flange part arranged to be fastened to the lower flange part and to fit around the condenser core above an upper shoulder chamfer of the shoulder. An upper flange chamfer of the upper flange part is arranged between an upper sealing element of the upper flange part and a lower sealing element of the lower flange part, such that an annular chamfer space is formed between the upper flange chamfer and the upper shoulder chamfer between the upper and lower sealing elements when the upper flange part is fastened to the lower flange part and fitted around the condenser core such that the upper and lower sealing elements contact the condenser core around its circumference. The flange comprises an injection through hole arranged for a filler material to be injected there through to fill the chamfer space.

According to another aspect of the present invention, there is provided a method of fitting an embodiment of the flange of the present disclosure around a condenser core. The method comprises inserting the condenser core, led by its lower end, through the annulus of the lower flange part until the lower shoulder chamfer of the shoulder rests against the lower flange chamfer. The method also comprises inserting the condenser core, led by its upper end, through the annulus of the upper flange part until said upper flange part contacts the lower flange part against which the lower shoulder chamfer rests. The method also comprises, then fastening the upper flange part to the lower flange part.

According to another aspect of the present invention, there is provided a bushing comprising an embodiment of the flange of the present disclosure, and the condenser core. The lower flange part is fitted around the radial shoulder of the condenser core such that the lower shoulder chamfer of the shoulder rests against the lower flange chamfer around the circumference of the condenser core. The upper flange part is fastened to the lower flange part and fitted around the condenser core above the upper shoulder chamfer of the shoulder such that the annular chamfer space is formed.

According to another aspect of the present invention, there is provided a method of filling the annular chamfer space in an embodiment of the bushing of the present disclosure. The method comprises injecting a filler material through the injection through hole into the annular chamfer space. The method also comprises curing the injected filler material.

According to another aspect of the present invention, there is provided a method of removing the flange from the condenser core of an embodiment of the bushing of the present disclosure. The method comprises removing the filler material from the injection through hole, from the outside of the flange. The method also comprises unfastening the lower flange part from the upper flange part. The method also comprises removing the unfastened lower flange part from the condenser core by moving it longitudinally along the condenser core and off its lower end. The method also comprises, after the removing of the filler material from the injection through hole and the unfastening of the lower flange part, loosening the upper flange part from the condenser core by shearing such that the filler material in the annular chamfer space no longer binds the upper flange part to the condenser core.

By means of the annular chamfer space which is formed between the upper flange chamfer and the upper shoulder chamfer of the condenser core shoulder, between the upper and lower sealing elements, the flange can be securely fitted around the condenser core, without there having to be a perfect fit in diameter between the condenser core and the flange, since the chamfer space can be filled with a filler material to remove any wiggle room between the flange and the condenser core. The upper flange chamfer is thus fixated in relation to the upper shoulder chamfer of the condenser core, preferably around the whole circumference of the condenser core and flange. By means of the chamfer space being delimited by the upper and (especially) lower sealing elements, e.g. O-rings, the filler material is prevented from filling any space between the flange and the condenser core outside of the chamfer space, e.g. any annular longitudinal (i.e. concentric) space below the lower sealing element. Thus, the filler material, in so far as it acts as a glue, will only bind the flange to the condenser core at said chamfer space, making it easier to remove the upper flange part from the condenser core, if desired e.g. if the core is damaged and has to be discarded whereby reuse of the flange is enabled.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 1 is an illustration of a flange fitted around a part of a condenser core, in longitudinal section, in accordance with embodiments of the present invention.

FIG. 2 is a detail of FIG. 1, in longitudinal section, in accordance with embodiments of the present invention.

FIG. 3 illustrates the respective angles of the upper and lower shoulder chamfer, and corresponding upper and lower flange chamfer, planes relative to the longitudinal axes of the condenser core and flange, in accordance with embodiments of the present invention.

DETAILED DESCRIPTION

Figure 4:
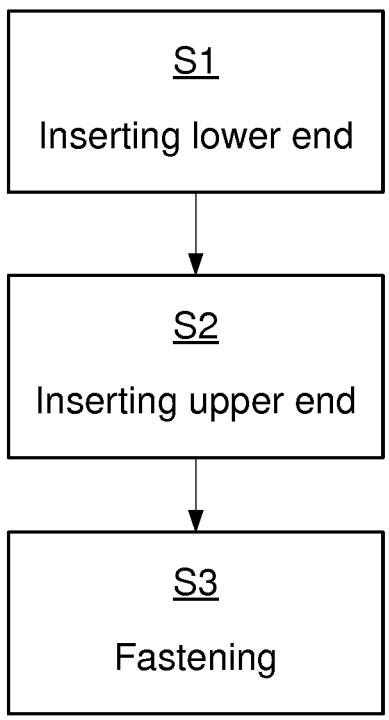
FIG. 4 is a schematic flow chart of an embodiment of a method of fitting a flange around a condenser core, in accordance with the present invention.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Herein, the words "upper" and "lower" are used to differentiate between different parts of the bushing. These relate to the normal intended position of the bushing when installed, e.g. in a transformer. Of course, when the bushing is not installed, e.g. before fitting the flange around the condenser core or during handling of the bushing, the flange parts, and condenser core ends etc., can be in any elevational relationship to each other. Alternatively, the word "upper" could be replaced with the word "distal", and the word "lower" could be replaced with the word "proximal", referring to the distal and proximal relationships, when installed, to an electrical device which the bushing is intended to be installed in association with, or with the words "first" and "second", respectively.

When installed, the end of the bushing which is proximal to an electrical device, e.g. transformer winding, is typically lower than the end of the bushing (or condenser core thereof) which is distal to said electrical device. For instance, the upper end of the bushing may be outside of a transformer tank of a liquid filled transformer, while the lower end of the bushing (or condenser core thereof) may be inside said transformer tank, the bushing being arranged through a wall of the transformer tank.

Thus, according to an aspect of the present invention, there is provided an electrical power transformer comprising an embodiment of the bushing of the present disclosure arranged through a wall of a casing, e.g. a transformer tank, of the electrical power transformer, e.g. a liquid filled transformer.

FIG. 1 illustrates a longitudinal part of a bushing 1 comprising a flange 2 fitted around a condenser core 3. The condenser core 3 is essentially round cylindrical, having a longitudinal axis A. The condenser core 3 has a radial shoulder 4, i.e. a thicker part having a longer radius than the adjacent longitudinal parts of the condenser core from the axis A 360° around the condenser core.

An objective of the shoulder 4 is for securely fitting the flange 2 around the core 3. The flange 2 is typically arranged for fastening the bushing 1 to a wall through a hole in which the bushing is positioned. Thus, the flange 2 may be provided with a lower surface 9 arranged to be fastened to an outer surface of such a wall, e.g. of a casing, such as a building or tank, of an electrical device with which the bushing 1 is associated (typically arranged to provide a passage in the longitudinal through hole 10 of the core 3 through the wall for an electrical conductor connected to the electrical device).

In accordance with the present invention, the shoulder 4 is formed by means of a lower shoulder chamfer 5 and an upper shoulder chamfer 6. Each of the chamfers 5 and 6 provide a gradual increase of the radius of the core 3 from the longitudinal ends of the shoulder towards the middle of the shoulder. This implies that each of the chamfers 5 and 6 provides a conical outer surface defining the shoulder 4. This is in contrast to a stepwise (90°) transition between the longer radius of the shoulder and the shorter radius of the core 3 outside of the shoulder 4.

The flange 2 comprises two separate annular parts, herein called a lower flange part 7 and an upper flange part 8, each of which is configured to fit around the condenser core 3 at its shoulder 4 and to be fastened to each other over the shoulder 4 to prevent longitudinal movement of the flange along the core 3. When fitted, the flange 2 has a longitudinal axis B which superposition the longitudinal axis A of the core 3.

The lower flange part 7 can be fitted around the core 3 by threading the core through the annulus of the lower flange part 7, led by the lower (proximal) end of the core, until the lower flange part 7 reaches the shoulder 4. The lower flange part 7 is shaped forming a lower flange chamfer such that the upper part of the lower flange part can accommodate the shoulder 4 while the lower part of the lower flange part cannot accommodate the shoulder, i.e. the annulus of the lower flange part has a longer radius at the upper part of the lower flange part and a shorter radius at the lower part of the lower flange part 7. Thus, the lower shoulder chamfer 5 of the shoulder 4 will rest against an inner surface of the lower flange part 7, forming the lower flange chamfer, around the circumference of the condenser core. Typically, the lower flange chamfer is correspondingly shaped to make contact with the lower shoulder chamfer 5 such that the plane of the lower shoulder chamfer coincides with the plane of the lower flange chamfer. That the lower shoulder chamfer 5 thus has a conical shape may be important to be able to fit a core 3 with large diameter tolerances into the lower flange part. An important issue is to lock the condenser core 3 and the flange so that they cannot move with respect to each other in any radial direction. This gives a mechanical lock which can withstand a large lateral force. This withstand may be needed e.g. when a cantilever load is applied to an end of the condenser core.

Similarly, the upper flange part 8 can be fitted around the core 3 by threading the core through the annulus of the upper flange part 8, led by the upper (distal) end of the core, until the lower flange part 7 reaches the lower flange part 7 and is fastened thereto. The annulus of the upper flange part 8 has a longer radius at a lower part of the upper flange part and a shorter radius at an upper part of the upper flange part 8, defining an upper flange chamfer which typically corresponds to the upper shoulder chamfer 6. However, since the core 3, with its shoulder 4, may not have an exact radial and/or longitudinal fit with the flange 2, the upper flange chamfer of the upper flange part 8 might not contact the upper shoulder chamfer 6 when the lower shoulder chamfer 5 rests against the inner surface of the lower flange part 7, forming a chamfer space or cavity as explained further with reference to FIG. 2 (below).

In some embodiments, a top insulator (not shown) of the bushing 1, covering a top end of the condenser core 3 is fastened to the upper flange part 8. For instance, in some embodiments, the upper flange part 8 may be integrated in such a top insulator.

The condenser core may be of any conventional material, e.g. RIP, having a wound web of paper forming wound layers around the axis A, the space between the layers being filled with a thermosetting resin, or RIS, having a mesh of synthetic fibres, the space between fibres being filled with a thermosetting resin. The thermosetting resin of RIS may be more cast than impregnated. In some embodiments, an inorganic particulate filler may be used mixed with the resin matrix, especially for RIS. Since the production of RIS condenser cores, especially ones with an inorganic particulate filler, may not result in cracks at the surface of the core, as is common with RIP, machining may not be necessary, nor at all desired. However, without machining, the diameter of the condenser core 3 may vary somewhat due to shrinkage of the core during curing of the resin, implying that there may be some undesirable wiggle room between the condenser core and the flange 2 when fitted onto the core 3.

The inorganic particulate filler may e.g. comprise or consist of silicone oxide ($SiO_2$) and/or aluminium oxide ($Al_2O_3$), preferably aluminium oxide ($Al_2O_3$).

The thermosetting resin may e.g. be an epoxy resin or a polyurethane resin, preferably an epoxy resin.

FIG. 2 illustrates in more detail the surroundings of the upper and lower shoulder chamfers 6 and 5 when the flange 2 is fitted around the core 3. The upper flange part 8 is fastened to the lower flange part 7, and the flange is fitted around the shoulder 4 with the lower shoulder chamfer 5 resting against the lower flange chamfer 28, as discussed in relation to FIG. 1 (above). Due to the not exact fit between the core 3 and the flange 2, concentric spaces 21, 23 and 24 are formed between the core 3 and the flange 2. The width of the concentric spaces may be made significantly larger than the span of the radial tolerances of the dimensions of the condenser core 3, so that even though the condenser core radius differs from one case to another, enough space 21 is provided to inject the filler material (for it to flow through the space). The concentric spaces are longitudinally separated from each other by means of sealing elements 25 and 26 which seals the gap between the core 3 and the flange 2 around the whole circumference of the core. Any or both of the sealing elements 25 and 26 may be in the form of an O-ring, typically held in place in a groove in the inner surface of the flange. An upper sealing element 25 is part of the upper flange part 8, and a lower sealing element 26 is typically part of the lower flange part 7, but may in some embodiments be part of the upper flange part 8, such that the upper flange chamfer 27 is positioned between said upper and lower sealing elements when the upper and lower flange parts 7 and 8 are fastened to each other. An annular sealing element (not shown) may also be positioned between the upper and lower flange parts 8 and 7, preventing any liquid (or even gas) leakage between the respective surfaces of the upper and lower flange parts which are fastened to each other.

When the flange 2 is fitted around the core 3, an annular chamfer space 21 is formed around the core between the upper and lower sealing elements 25 and 26, and between the upper shoulder chamfer 6 and the upper flange chamfer 27. To fix the flange in relation to the core, avoiding wiggling there between, the chamfer space 21 can be filled with a filler material. By means of the filler material, the core is fixed in relation to the flange by the direct contact between the lower shoulder chamfer and the lower flange chamfer 28, and by the filler material filling the chamfer space between the upper shoulder chamfer 6 and the upper flange chamfer 27.

For enabling the filling of the chamfer space with the filler material, an injection through hole 22 is provided through the flange 2, in the upper flange part 8, or alternatively in the lower flange part 7, with an inner opening in the chamfer space 21. Thus, if the injection through hole 22 is provided in the upper flange part 8, which may be convenient for some embodiments, the inner opening of the hole 22 may be at the upper flange chamfer 27, e.g. in the upper flange chamfer, above the upper flange chamfer or below the upper flange chamfer, such that the inner opening is between the upper and lower sealing elements 25 and 26 when the flange 2 is fitted around the condenser core 3 such that it opens into the chamfer space 21, and an outer opening of the hole 22 is in an outer surface of the upper flange part. Similarly, if the injection through hole 22 is provided in the lower flange part 7, which may be convenient in some other embodiments, the inner opening of the hole 22 may be above the lower sealing element 26, such that the inner opening is between the upper and lower sealing elements 25 and 26 when the flange 2 is fitted around the condenser core 3 such that it opens into the chamfer space 21, and the outer opening of the hole 22 is in an outer surface of the lower flange part. In the embodiment of FIG. 2, the injection through hole 22 is provided in the upper flange part 8, which is an example embodiment.

The filler material may thus be injected into the chamfer space 21 through the injection through hole 22 from the outside of the flange 2 after the flange has been fitted around the core. The filler material may comprise or consist of a thermosetting resin, e.g. an epoxy, silicone, polyurethane or acrylic resin, preferably an epoxy resin. The resin of the filler material may preferably be the same as the resin in the core 3. The filler material may also comprise an inorganic particulate filler, e.g. of aluminium oxide, $Al_2O_3$. In some embodiments, the filler material comprises a particulate inorganic filler in a thermosetting resin which is the same as a particulate inorganic filler in a thermosetting resin in the core.

By means of the upper and lower sealing elements 25 and 26, the filler material does not flow into any concentric spaces 23 and 24 longitudinally beyond the chamfer space 21. For instance, the lower sealing element 26 prevents the filler material from flowing down into the lower space 23 longitudinally extending below the chamfer space 21, during injection of the filler material. To this end, the lower sealing element 26 is preferably positioned close to the upper flange chamfer 27, at least closer to the upper flange chamfer 27 than to the lower flange chamfer 28 configured for the lower shoulder chamfer 5 to rest there against.

After injection of the filler material into the chamfer space 21, the filler material, i.e. the thermosetting resin thereof, may be cured, typically by raising the temperature of the chamfer space to above a curing temperature of the resin. Usually, some filler material will also be present in the injection hole 22 after the injection.

By the filler material being only in the chamfer space 21, and not in the adjacent concentric spaces 23 and 24, and thus there potentially binding the flange to the core (the filler material acting as a glue), the upper flange part 8 may be more easily removed from the core and reused if desired. The removal of the upper flange part is also facilitated by the transition to the shoulder 4 being in the form of a chamfer 6 and not stepwise (90°). The upper flange part may thus more easily be loosened from the core 3 by shearing and/or longitudinal pulling to break the bond formed by the filler material. Since there may be some cured filler material in the injection hole 22, some or all of this filler material may first be removed from the injection hole, e.g. by drilling in the hole via its outer opening, before loosening the flange part 7 or 8 comprising the hole 22, typically the upper flange part 8, from the core to facilitate said loosening.

FIG. 3 illustrates the respective angles α and β of the surfaces of the upper shoulder chamfer 6 and the upper flange chamfer 27, as well as the respective angles γ and δ of the surfaces of the lower shoulder chamfer 5 and the lower flange chamfer 28, relative to the longitudinal axes A and B of the core 3 and the flange 2, respectively.

Preferably, the angle α of the upper shoulder chamfer is the same or close to the angle β of the upper flange chamfer 27. However, thanks to the tolerances provided by the chamfer space 21, some differences between the angles α and β may be allowable, and may e.g. result from the shrinking of the core during curing. Each of the angles α and β are less than 90°, such as within the range of 10-80°, e.g. within the range of 25-65° or 35-55°, preferably about 45°. Such a relatively large angle of α and β may be suitable for facilitating removal and reuse of the flange while still providing mechanical locking of the flange 2 to the core 3 via the filler material.

Preferably, the angle γ of the lower shoulder chamfer 5 is the same or close to the angle δ of the lower flange chamfer 28, allowing the surface of the lower shoulder chamfer 5 to lie flat against the surface of the lower flange chamfer 28 for increased stability when the shoulder 4 of the core 3 rests against the lower flange chamfer. Each of the angles γ and δ are less than 90°, such as within the range of 3-45°, e.g. within the range of 5-30° or 7.5-15°, such as of about 10°. Such a relatively small angle of γ and δ may provide both the mechanical locking and in the same time a large surface area where the two parts (core and flange) connect to each other.

FIG. 4 is a flow chart of an embodiment of the method of fitting the flange 2 around the condenser core 3.

The condenser core 3, led by its lower end, is inserted S1 through the annulus of the lower flange part 7 until the lower shoulder chamfer 5 of the shoulder 4 rests against the lower flange chamfer 28 of said lower flange part.

After or concurrently with the condenser core 3 being inserted S1 through the lower flange part 7, the condenser core 3, led by its upper end, is inserted S2 through the annulus of the upper flange part 8 until said upper flange part contacts the lower flange part 7 against which the lower shoulder chamfer 5 rests.

That the condenser core 3 is inserted S1 and S2 through the lower and upper flange parts 7 and 8 indicate a relative movement between the condenser core and the flange parts 7 and 8, respectively, resulting in the flange parts 7 and 8 being fitted around the condenser core, and do not indicate whether any of the core 3 and flange parts 7 and 8 are fixed or moving in relation to the ground. In some embodiments, it may be convenient that the condenser core 3 is fixed in relation to the ground, while the flange parts 7 and 8 are moved.

Then, the upper flange part 8 and the lower flange part 7 are fastened to each other, e.g. by means of bolts.

Figure 5:
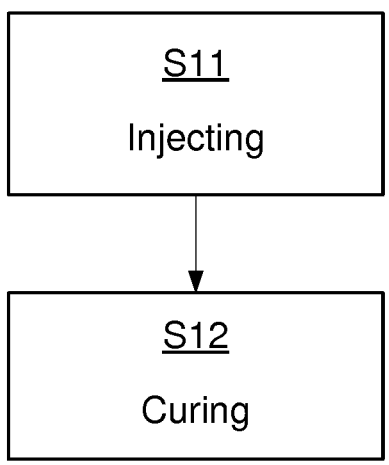
FIG. 5 is a schematic flow chart of an embodiment of a method of filling the annular chamfer space, in accordance with the present invention.

FIG. 5 is a flow chart of an embodiment of the method of filling the annular chamfer space 21 in the bushing 1. A filler material is injected S11 through the injection through hole 22 into the annular chamfer space 21. Then, the injected S11 filler material is cured S12, e.g. by heating the filler material in the annular chamfer space 21 to a temperature above a curing temperature of said filler material, e.g. a thermosetting filler material, or by waiting until the filler material cures in room temperature if it comprises a room temperature curable resin.

Figure 6:
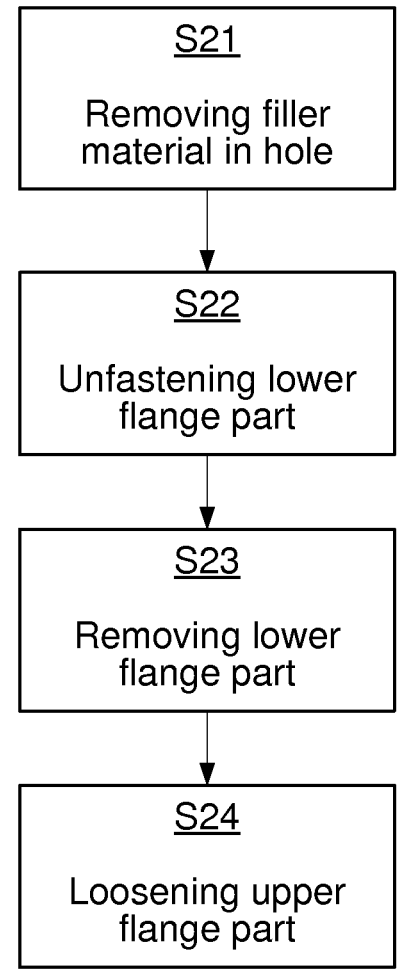
FIG. 6 is a schematic flow chart of an embodiment of a method of removing the flange from the condenser core, in accordance with the present invention.

FIG. 6 is a flow chart of an embodiment of the method of removing the flange 2 from the condenser core 3 of the bushing 1. As mentioned herein, an advantage with the flange 2 of the present invention is that it can more easily be recovered and reused, e.g. if the condenser core 3 has been damaged and has to be discarded.

The filler material is removed S21 from the injection through hole 22, from the outside of the flange 2, e.g. the upper flange part 8 of the flange 2. For instance, a drill inserted through the outer opening of the injection through hole 22, may be used to drill away the filler material therein.

Before, after or concurrently with the removal S21 of the filler material, the lower flange part 7 and the upper flange part 8 are unfastened S22 from each other. Then, the unfastened S22 lower flange part 7 is removed S22 from the condenser core 3 by moving it longitudinally along the condenser core and off its lower end. Again, that the flange part 7 is moved along the condenser core 3 indicates a relative movement between the flange part 7 and the condenser core 3, and does not indicate that the flange part or the condenser core is fixed or moving in relation to the ground.

After the removing S21 of the filler material from the injection through hole and the unfastening S22, the upper flange part 8 is loosened S24 from the condenser core 3 by shearing such that the filler material in the annular chamfer space 21 no longer binds the upper flange part to the condenser core. Typically, the filler material binds the upper flange part 8 to the condenser core, but by virtue of the limited annular chamfer space 21, delimited by the upper and lower sealing elements 25 and 26, and the chamfering of the upper shoulder chamfer 6, the binding is more easily broken and the upper flange part can be removed and reused. Also the upper flange part 8 may be removed from the condenser core, by moving it longitudinally along the condenser core and off its upper end.

In some embodiments of the present invention, the upper flange chamfer 27 is at an angle $\beta$ to a longitudinal axis B of the flange 2 within the range of 10-80°, e.g. within the range of 25-65° or 35-55°, such as of about 45°, typically corresponding to the angle of the upper shoulder chamfer 6 of the condenser core to which the upper flange part 8 is to be fitted.

In some embodiments of the present invention, the upper shoulder chamfer 6 is at an angle $\alpha$ to a longitudinal axis A of the condenser core 3 within the range of 10-80°, e.g. within the range of 25-65° or 35-55°, such as of about 45°.

In some embodiments of the present invention, the lower flange chamfer 28 is at an angle $\delta$ to a longitudinal axis B of the flange 2 within the range of 3-45°, e.g. within the range of 5-30° or 7.5-15°, such as of about 10°, typically corresponding to the angle of the lower shoulder chamfer 5 of the condenser core which rests against the lower flange chamfer 28.

In some embodiments of the present invention, the lower shoulder chamfer 5 is at an angle $\gamma$ to a longitudinal axis A of the condenser core 3 within the range of 3-45°, e.g. within the range of 5-30° or 7.5-15°, such as of about 10°.

In some embodiments of the present invention, the lower flange part 7 has a lower surface 9 arranged to be fastened to a wall of a casing, e.g. transformer tank, of an electrical power transformer, e.g. a liquid-filled transformer. The lower surface 9 may e.g. be provided with bolt holes.

In some embodiments of the present invention, the annular chamfer space 21 is filled with a filler material. In some embodiments, the filler material comprises a thermosetting resin, e.g. an epoxy, silicone, polyurethane and/or acrylic resin, preferably an epoxy resin. In some embodiments, the filler material comprises a particulate filler, e.g. of silicone oxide ($SiO_2$) and/or aluminium oxide, $Al_2O_3$, preferably aluminium oxide ($Al_2O_3$).

In some embodiments of the present invention, the condenser core 3 comprises a thermosetting resin, e.g. an epoxy resin and/or a polyurethane resin, preferably an epoxy resin. In some embodiments, the condenser core 3 is a resin impregnated paper (RIP) core or a resin impregnated synthetic (RIS) core, preferably a RIS core. In some embodiments, the condenser core (3) comprises a particulate filler in the thermosetting resin matrix, e.g. of silicone oxide ($SiO_2$) and/or aluminium oxide, $Al_2O_3$. In some embodiments, especially for RIS, silicone oxide ($SiO_2$) may be preferred.

In some embodiments of the present invention, a top insulator, covering a top end of the condenser core 3 is fastened to the upper flange part 8.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A flange to be fitted around a round cylindrical condenser core of a bushing, the flange comprising:
    an annular lower flange part arranged to fit around a radial shoulder of the condenser core such that a lower shoulder chamfer of the shoulder rests against lower flange chamfer of the lower flange part around the circumference of the condenser core;
    and an annular upper flange part arranged to be fastened to the lower flange part and to fit around the condenser core above an upper shoulder chamfer of the shoulder;
    wherein an upper flange chamfer of the upper flange part is arranged between an upper sealing element of the upper flange part and a lower sealing element of the lower flange part, such that an annular chamfer space is formed between the upper flange chamfer and the upper shoulder chamfer between the upper and lower sealing elements when the upper flange part is fastened to the lower flange part and fitted around the condenser core such that the upper and lower sealing elements contact the condenser core around its circumference;
    and wherein the flange comprises an injection through hole arranged for a filler material to be injected there through to fill the chamfer space.

2. The flange of claim 1, wherein the upper flange chamfer is at an angle to a longitudinal axis of the flange within the range of 10-80°.

3. The flange of claim 1, wherein the lower flange chamfer is at an angle to a longitudinal axis of the flange within the range of 3-45°.

4. The flange of claim 1, wherein the lower flange part has a lower surface arranged to be fastened to a wall of a casing of an electrical power transformer.

5. A method of fitting a flange of claim 1 around a condenser core, the method comprising:
    inserting the condenser core, led by its lower end, through the annulus of the lower flange part until the lower shoulder chamfer of the shoulder rests against the lower flange chamfer;
    inserting the condenser core, led by its upper end, through the annulus of the upper flange part until said upper flange part contacts the lower flange part against which the lower shoulder chamfer rests; and
    then, fastening the upper flange part to the lower flange part.

6. A bushing comprising:
    the flange of claim 1; and
    the condenser core;
    wherein the lower flange part is fitted around the radial shoulder of the condenser core such that the lower shoulder chamfer of the shoulder rests against the lower flange chamfer around the circumference of the condenser core; and
    wherein the upper flange part is fastened to the lower flange part and fitted around the condenser core above the upper shoulder chamfer of the shoulder such that the annular chamfer space is formed.

7. The bushing of claim 6, wherein the upper shoulder chamfer is at an angle to a longitudinal axis of the condenser core within the range of 10-80°.

8. The bushing of claim 7, wherein the lower shoulder chamfer is at an angle to a longitudinal axis of the condenser core within the range of 3-45°.

9. The bushing of claim 8, wherein the annular chamfer space is filled with a filler material.

10. The bushing of claim 9, wherein the filler material comprises a thermosetting resin.

11. The bushing of claim 10, wherein the filler material comprises a particulate filler.

12. The bushing of claim 11, wherein the condenser core is at least one of a resin impregnated paper (RIP) core or a resin impregnated synthetic (RIS) core.

13. The bushing of claim 12, wherein a top insulator, covering a top end of the condenser core is fastened to the upper flange part.

14. A method of filling the annular chamfer space in the bushing claim 13, wherein the method comprises:
injecting a filler material through the injection through hole into the annular chamfer space; and
curing the injected filler material.

15. A method of removing the flange from the condenser core of the bushing of claim 13, the method comprising:
removing the filler material from the injection through hole, from the outside of the flange;
unfastening the lower flange part from the upper flange part;
removing the unfastened lower flange part from the condenser core by moving it longitudinally along the condenser core and off its lower end; and
after the removing of the filler material from the injection through hole and the unfastening of the lower flange part, loosening the upper flange part from the condenser core by shearing such that the filler material in the annular chamfer space no longer binds the upper flange part to the condenser core.

16. The flange of claim 2, wherein the upper flange chamfer is at an angle of about 45° to the longitudinal axis of the flange.

17. The flange of claim 3, wherein the lower flange chamfer is at an angle of about 10° to the longitudinal axis of the flange.

18. The bushing of claim 10, wherein the thermosetting resin comprises an epoxy resin.

19. The bushing of claim 10, wherein the thermosetting resin comprises at least one of a silicone resin, a polyurethane resin, and an acrylic resin.

20. The bushing of claim 11, wherein the particulate filler comprises at least one of silicone oxide ($SiO_2$) and aluminium oxide ($Al_2O_3$).

* * * * *